UNITED STATES PATENT OFFICE.

ABRAHAM POLOTSKY, OF BERLIN-CHARLOTTENBURG, GERMANY, ASSIGNOR TO DEUTSCHE GASGLÜHLICHTAKTIENGESELLSCHAFT (AUERGESELLSCHAFT), OF BERLIN, GERMANY.

PROCESS FOR MAKING CELLULOSE ESTERS WITH OVER 20% OF BOUND FATTY ACID.

1,296,847.     Specification of Letters Patent.     Patented Mar. 11, 1919.

No Drawing.     Application filed February 8, 1915. Serial No. 6,961.

*To all whom it may concern:*

Be it known that I, ABRAHAM POLOTSKY, a subject of the Czar of Russia, and resident of Berlin-Charlottenburg, Germany, have invented certain new and useful Improvements in Processes for Making Cellulose Esters with Over 20% of Bound Fatty Acid, of which the following is a specification.

The object of the present invention is a process for producing cellulose-esters with over 20% of bound fatty acid, especially acetyl-cellulose. Hitherto the latter could only be obtained by treating any cellulose with acetic anhydrid or a mixture of acetic anhydrid and glacial acetic acid as an indifferent diluting medium in the presence of catalysts, such as for instance sulfuric acid, iodin, bromin, sodium bisulfate, chloracetic acid and the like. These processes require the use of acid anhydrid or acid chlorid, as *e. g.* acetic anhydrid or acetylchlorid, materials which are comparatively expensive. In the manufacture of formyl cellulose, however, we may work directly with concentrated formic acid.

In the process forming the object of this invention cellulose-esters are obtained by the action of the homologues of the formic acid *e. g.*, acetic, butyric, or propionic acids upon cellulose previously prepared in a certain manner with the simultaneous use of catalysts whereby the treatment is to be continued until the esterification is performed.

Hitherto processes for the production of cellulose esters with use of free fatty acid, for instance acetic acid, have been unknown. It is true that solutions of cellulose in sulfuric acid and acetic acid or in acetic acid and phosphoric acid have been prepared, and from them filaments, films and the like have been obtained by precipitation with water or other precipitating means. But with this process cellulose-esters never were obtained. In the article by Cross, Bevan and Traquair (*Chemiker-Zeitung* 1905), Vol. 29, it is stated that when boiling glacial acetic acid is added to a cellulose, a product is obtained which contains 4.2% acetic acid.

If we proceed according to this invention, we soon see that the so-called hydrated celluloses, no matter whether they are prepared directly from the cellulose or from derivatives of the same (oxy- and hydrocellulose), are highly appropriate for the direct formation of esters by means of the homologues of the formic acid (for instance acetic acid) and catalysts.

The term "hydrated celluloses" means a very great number of celluloses, which are specified in "Schwalbe, *Chemie der Cellulose*," 1911, page 160 *et seq.* The term "hydrated cellulose" comprises also most all derivatives of cellulose, as far as they are subsequently hydrated as well as hydrated cellulose which has subsequently been hydrolized or oxidized. Hydrated celluloses may be produced by the action of alkalis, acids, as well as solutions of salts upon cellulose, furthermore by precipitation of cellulose out of solvents or esters.

With most catalysts made use of in the new process, the hydrated cellulose is preferably employed in a swollen state, because swollen hydrated cellulose is much more fitted for being acetylized than unswollen, this for the reason that with the swollen hydrated cellulose the esterification-mixture is far better adapted to penetrate the same. It has hitherto not been possible to ascertain whether in this process only the mechanical condition of the form of cellulose is decisive or whether a special labile chemical modification of the cellulose, capable of reaction, plays its part.

The formation of esters will only take place, if the mixtures of the homologues of formic acid and the catalysts are brought into action a sufficiently long time. As catalysts we may for instance use: sulfuric acid, sulfuryl chlorids, hydrochloric acid, phosphoric acids, such as pyrophosphoric acid, metaphosphoric acid and the like or mixtures of these substances. If we use, *e. g.* only metaphosphoric acid as a catalyst, an acetylation indeed will occur, but the same will not proceed so quickly and not go so far as if a small quantity of sulfuric acid is added to the solution.

According to the catalysts employed and the form of cellulose made use of and according to the temperature at which the treatment takes place, we obtain different degrees of esterification, as will be seen by the following examples.

It is essential that with the decrease of the hydrolyzing action of the catalysts greater quantities of the same and higher temperatures will be required, whereas with the increase of the hydrolyzing action smaller quantities and lower temperatures will be sufficient for the performance of the operation. By this the process of reaction may be regulated at will, for instance as regards the duration of the process.

*Examples.*

(1) 20 grams of cellulose of any kind are ground in a mixture of 70–80 grams of sulfuric acid of a strength of 100% and 30–20 grams of water at a temperature of about 0–5 degrees C., so as to form a paste, when 100 grams of glacial acetic acid are added under continuous stirring. Thereby the hydrated cellulose is precipitated, and will be re-dissolved later on. After standing for about 24 to 48 hours at a temperature of 0–5° C., a precipitation by water is effected. The product resulting therefrom contains about 25–30% of acetic acid and is soluble in formic acid, phenol and lactic acid.

(2) 20 grams of cellulose of any kind are ground in a mixture of 70 grams of sulfuric acid of a strength of 100%, 10 grams of glacial acetic acid and 20 grams of water at a temperature of about 0–5° C. so as to form a paste. Hereupon a mixture of 100 grams of glacial acetic acid and 10 grams of sulfuric acid is added under continuous stirring. The hydrated cellulose thereby precipitated will gradually be re-dissolved. After the reaction mixture has been allowed to stant for about 24–48 hours at a temperature of 0–10° C. the product is precipitated by water and will now be found to contain about 30% of acetic acid. It is soluble in formic acid, phenol and lactic acid.

(3) 10 grams of cellulose are ground in a mixture of 35 grams of concentrated sulfuric acid, 10 grams of water and 5 grams of glacial acetic acid to form a viscous mass, when a mixture of 50 grams glacial acetic acid and 5 grams of concentrated sulfuric acid is added. As soon as the hydrated cellulose previously precipitated has been re-dissolved, a mixture of 110 grams of glacial acetic acid and 35 grams of fuming sulfuric acid, containing 33% of sulfuric acid anhydrid is added (after 24 hours). The product, after having been allowed to stand over for 24 hours, presents a proportion of acetic acid of 31%, and 24 hours later a proportion of 42%. The temperature was about 1–2° C. The product thereby obtained is soluble in formic acid, phenol, lactic acid, a mixture of tetrachlorid of acetylene and methyl alcohol.

(4) 5 grams of cotton are dissolved at a temperature of 5–10° C. in sulfuric acid of 70%, precipitated by water and washed out, whereupon the water is driven out by glacial acetic acid. This swollen cellulose hydrolyzed by the sulfuric acid is allowed to stand with 50 grams of glacial acetic acid, into which 1½ grams of gaseous hydrochloric acid had previously been introduced, during 48 hours at normal temperature. The preparation contains 24% of acetic acid. The product is insoluble in most solvents, so that it may be considered essentially as a by-product for the further esterification with acetic anhydrid.

(5) 5 grams of filter-paper are transformed by a solution of caustic soda (20%) into hydrated cellulose. The sodium lye is washed out with water and the water driven off by glacial acetic acid. The swollen hydrated cellulose is submerged in a mixture of 50 grams of glacial acetic acid and 100 grams of phosphoric acid, previously heated up to 220° C., whereby the cellulose goes into solution. After an action continued for 48 hours (at normal temperature) a product containing about 30% of acetic acid is obtained. The product is insoluble in most solvents, so that it may be considered principally as a by-product for the further esterification with acetic anhydrid.

(6) 20 grams of cellulose are ground at a temperature of 1° in a mixture of 70 grams of sulfuric acid, 20 grams of water and 10 grams of propionic acid so as to form a viscous mass, whereupon a mixture of 100 grams of propionic acid and 10 grams of sulfuric acid are added. The hydrated cellulose thereby precipitated goes gradually again into solution and 48 hours later we obtain a product containing 30% of propionic acid. The product is soluble in formic acid, phenol and lactic acid.

(7) 5 grams of cotton are transformed by solution of sodium hydroxid (20%) into hydrated cellulose, whereupon the solution of sodium hydroxid is washed out and the water driven out by glacial acetic acid. The swollen hydrated cellulose obtained in this manner is treated at normal temperature with 50 grams of glacial acetic acid and 12 grams of fuming sulfuric acid (7% anhydrid). The product will now contain 25% of acetic acid. It is insoluble in most solvents, so that it may be considered principally as a by-product for the further esterification with acetic anhydrid.

(8) 5 grams of cellulose are ground at a temperature of about 5° C. in sulfuric acid (70%) so as to form a viscous mass, precipitated by water, washed out, whereupon the water is driven off by glacial acetic acid. This cellulose is treated at normal temperature (during 48 hours) with 50 grams of glacial acetic acid and 10 grams sulfuric chlorid. The preparation will contain 63% of acetic acid and is soluble in chloroform, tetrachlorid of acetylene and the like.

(9) 5 grams of cotton are transformed by solution of sodium hydroxid (32%) into hydrated cellulose, washed out and dried; thereupon the product obtained in this way is treated for 24 hours at a temperature of 72° C. with a mixture of 50 grams of glacial acetic acid and 10 grams of commercial pyrophosphoric acid. The preparation will contain 58% of acetic acid and be soluble in chloroform, symmetric ethane tetrachlorid ($CHCl_2CHCl_2$) and the like.

(10) 5 grams of hydrated cellulose are transformed at a temperature of 60–70° C. by a treatment with glacial acetic acid containing 0.5% of sulfuric acid, into hydrocellulose. The hydrated hydro-cellulose thereby obtained is treated with a reaction mixture, consisting of 40 grams acetic anhydrid, 20 grams of metaphosphoric acid and 0.6 gram of concentrated sulfuric acid. After an action continued for 24 hours at normal temperature an acetate of cellulose with about 58% of bound acetic acid is obtained. The product is soluble in chloroform, symmetric ethane tetrachlorid ($CHCl_2CHCl_2$) and the like.

The cellulose-esters so formed are isolated in the usual manner, and by the usual precipitating means.

The cellulose-esters obtained according to the above-mentioned examples possess, as regards quality and solubility, certain peculiarities which, of course, are dependent on the manner of preparing them and can, therefore, be very different. This is no characteristic feature of the new process, but it is a fact known long ago, e. g. in the case of acetyl-cellulose, prepared by means of acetic anhydrid, that the quality and solubility of the products depends largely on the experimental conditions.

The homologues of formic acid include a large number of acids, some of which would not re-act with cellulose, under the conditions stated. I employ only those which will so re-act. I avoid, as above stated, the use of the highly expensive materials acetic anhydrid, acetyl chlorid and like derivatives, and use the acid itself.

What I claim as my invention and desire to secure by United States Letters Patent is:

1. A process of producing a cellulose ester which comprises the step of adding to a hydrated cellulose, a fatty acid which is a homologue of formic acid, and which is capable of re-acting with hydrated cellulose; in the presence of a catalyst, but in the absence of material amounts of fatty acid anhydrid and halid of a fatty acid radical.

2. A process of producing a cellulose ester which comprises the step of adding to a hydrated cellulose, a fatty acid which is a homologue of formic acid, and which is capable of re-acting with hydrated cellulose; in the presence of a mineral acid capable of acting as an esterifying catalyst, but in the absence of material amounts of fatty acid anhydrid and halid of a fatty acid radical.

3. A process of producing a cellulose ester which comprises the step of adding to a swollen hydrated cellulose, a fatty acid which is a homologue of formic acid, and which is capable of reacting with hydrated cellulose; in the presence of a catalyst, but in the absence of material amounts of fatty acid anhydrid and halid of a fatty acid radical.

4. A process of producing a fatty acid ester of cellulose which comprises reacting upon hydrated cellulose with a mixture consisting exclusively of a catalyst and a fatty acid capable of uniting with such hydrated cellulose.

5. The process of making cellulose esters which comprises treating cellulose with sulfuric acid, precipitating, washing the hydrated cellulose thus produced with water, treating with glacial acetic acid and in the presence of a catalyst finally recovering the thus produced ester.

6. A process of producing a cellulose ester which comprises treating cellulose with sulfuric acid to form hydrated cellulose and re-acting upon the hydrated cellulose so produced, with a mixture consisting exclusively of a catalyst and a fatty acid capable of uniting with such hydrated cellulose.

7. A process of producing a cellulose ester which comprises treating cellulose with sulfuric acid to form hydrated cellulose and re-acting upon the hydrated cellulose so produced with a mixture of esterifying catalyst and fatty acid.

ABRAHAM POLOTSKY.

Witnesses:
  HENRY HASPER,
  WOLDEMAR HAUPT.